(12) United States Patent
Courchesne (10) Patent No.: US 6,905,218 B2
(45) Date of Patent: Jun. 14, 2005

(54) PANORAMIC AND HORIZONTALLY IMMERSIVE IMAGE DISPLAY SYSTEM AND METHOD

(76) Inventor: Luc Courchesne, 3486 Laval Street, Montreal Quebec (CA), H2Y 8C9

( * ) Notice: Subject to any disclaimer, the term of this patent is extended or adjusted under 35 U.S.C. 154(b) by 0 days.

(21) Appl. No.: 10/120,353

(22) Filed: Apr. 12, 2002

(65) Prior Publication Data

US 2002/0149752 A1 Oct. 17, 2002

Related U.S. Application Data

(60) Provisional application No. 60/283,188, filed on Apr. 12, 2001.

(51) Int. Cl.[7] .......................... G03B 21/00; G03B 21/26
(52) U.S. Cl. .......................... 353/122; 353/28; 353/30; 353/119
(58) Field of Search ............................. 353/10, 69–71, 353/28, 30, 119, 7, 8, 11, 48, 50, 51, 79, 122; 352/69, 70, 85, 132, 198; 348/36, 39, 776, 206; 359/443, 451

(56) References Cited

U.S. PATENT DOCUMENTS

| 3,505,465 | A |   | 4/1970  | Rees |
| 3,740,469 | A | * | 6/1973  | Herndon .................... 348/36 |
| 3,785,715 | A |   | 1/1974  | Mecklenborg |
| 3,822,936 | A |   | 7/1974  | Troje et al. |
| 3,998,532 | A | * | 12/1976 | Dykes ......................... 352/69 |
| 4,078,860 | A | * | 3/1978  | Globus et al. ................ 352/69 |
| 4,100,571 | A |   | 7/1978  | Dykes et al. |
| 4,656,506 | A | * | 4/1987  | Ritchey ....................... 348/39 |
| 4,885,878 | A |   | 12/1989 | Wuu |
| 5,721,585 | A |   | 2/1998  | Keast et al. |
| 5,724,775 | A | * | 3/1998  | Zobel et al. .................. 52/82 |
| 5,762,413 | A |   | 6/1998  | Colucci et al. |
| 6,231,189 | B1| * | 5/2001  | Colucci et al. ............... 353/20 |
| 6,327,020 | B1| * | 12/2001 | Iwata .......................... 352/69 |

FOREIGN PATENT DOCUMENTS

| CA | 2012049  | 2/1998 |
| JP | 5307212  | 5/1992 |
| JP | 10111534 | 10/1996 |

OTHER PUBLICATIONS

"Panoramic Visual Display Properties, Optical Physics," www.opticalphysics.com.
"Applications of Panoramic Visual Displays, Optical Physics," www.opticalphysics.com.
"Summary of Current Technology, Optical Physics," www.opticalphysics.com.

* cited by examiner

Primary Examiner—Judy Nguyen
Assistant Examiner—Andrew Sever
(74) Attorney, Agent, or Firm—Ogilvy Renault (57) ABSTRACT

An image display system for surrounding a horizontal field of view of a viewer with images. The image display system comprises a portion of a sphere having a concavity defining an inner surface. A projection device is adapted to project images from a center of a radius of curvature of the portion of a sphere so as to project images on the inner surface of the portion of a sphere. The image display system is adapted to partially receive viewers in the concavity such that at least a horizontal field of view of the viewers is surrounded by an image projected from the center on the inner surface of the portion of a sphere.

17 Claims, 6 Drawing Sheets

PANORAMIC AND HORIZONTALLY IMMERSIVE IMAGE DISPLAY SYSTEM AND METHOD

This application is a Provisional of Application Ser. No. 60/283,188, filed Apr. 12, 2001.

BACKGROUND OF THE INVENTION

1. Field of the Invention

The present invention relates generally to a system and a method for displaying panoramic and horizontally immersive images.

2. Brief Description of the Prior Art

A first class of prior art panoramic or immersive image display systems use a window corresponding more or less to the field of vision of a spectator. This window can be displaced by the spectator to show different portions of 360° panorama or of a sphere or a segment of a sphere around the point of view. The window is, for example, the fixed screen of a computer; a screen or projection moving around viewers and displaced either manually or automatically by, for example, head or body tracking; or a headset with an eye piece and a device for displacing the field of vision in relation to movement of the spectator's head.

The prior art systems of the first class present the drawback, for the head mounted displays versions, of isolating the spectator and require for each spectator complex adjustment and handling. The prior art systems of the first class also present the drawback, for the screens versions, to produce no definite feeling of immersion (i.e., the spectator is not at least partially surrounded by images) and an undesirable phenomenon known as tunnel vision.

A second class of prior art systems uses the juxtaposition of several images to form a full "composite" panoramic image. This technique creates a horizontally immersive space that can be shared simultaneously by many individuals that are free to look around. To create the full panoramic space, either projection (front or rear projection on a cylindrical or spherical screen) or juxtaposition of video monitors (video wall) can be used. Panoramic projection requires a number of projectors and image sources to cover, by front or rear screen projection, segments of a 360° cylindrical screen or of a sphere or frustum of a sphere.

Due to the high cost and high complexity connected to the presentation of panoramic programs using a plurality of projectors or monitors, the prior art systems of the second class are generally custom designed and dedicated to specific applications with the result that such systems are rare, ephemeral, and that no significant sharable repertoire of content exists for them.

A third class of prior art systems uses hemispheric projection to cover more or less a full half sphere using a single image source and projection apparatus. These systems generally used in planetariums and other types of hemispheric theatres, such as those developed by IMAX Corporation and Elumens Corporation among others, are designed to cover the entire field of vision of a sitting or standing audience looking generally in the same direction.

U.S. Pat. No. 5,762,413, issued to Colucci et al. on Jun. 9, 1998, discloses a tiltable hemispheric optical projection system. This projection system comprises a downwardly flaring hemisphere screen having an inner surface that serves as a hemispheric screen. Projection optics are upstanding from the ground to the center of the hemisphere, and project images on given areas of the hemispheric screen. People are positioned on the ground in the hemisphere so as to be in position to observe the images projected on the hemispheric screen. The projection optics that project the images on the hemispheric screen are positioned in the center of the hemisphere and are thus at a generally constant radius from the hemispheric screen, so as to produce little distortion when projecting images thereon. The projection optics are pivotally mounted on a base so as to be oriented to project the images on various portions of the hemispheric screen.

The prior art systems of the third class do not have the viewers surrounded by the projection area, and thus always come short of full horizontal 360° immersivity. Because of this, the prior art systems of the third class can be compared with the prior art systems of the afore-mentioned first class where full horizontal panoramic imaging can only be achieved by moving the hemispheric projection apparatus about the entire image, with the drawback that the audience is not free to look around as they can in fully immersive panoramas.

A fourth class of prior art systems also uses hemispheric projection to cover at least a full half of a hemispheric screen, but have the projectors positioned such that a spectator in the hemisphere is surrounded by images.

U.S. Pat. No. 6,327,020, issued on Dec. 4, 2001 to Iwata, discloses a full-surround spherical screen projection system. The full-surround spherical screen projection system comprises a sphere provided with an inner spherical screen for the projection of 360° peripheral images by way of a single projector. The projector is preferably placed vertically in an upper portion of the sphere above a spectator in the sphere, and projects images through a hole in a first convex annular mirror. The projected image is first reflected by a second mirror within the sphere towards the first convex annular mirror, which reflects the image towards the spherical screen. The spectator is preferably positioned so as to have his head in the center of the sphere. The positioning of the first and second mirrors in the sphere requires that the image projected by the projector be distorted in order to get a distortion-free image on the screen. Accordingly, a recording apparatus is required to enable capturing highly distorted images that will correspond to the positioning of the mirrors in the sphere so as to produce distortion-free images. The severe alteration of the images to produce distortion-free images from such an eccentric position involves a complex solution and one that will not guarantee adequate image quality especially in the bottom half of the sphere. Another drawback is that it will be practically impossible to guarantee an even image brightness on the surface of the sphere since the projection distance varies considerably between the top and bottom of the sphere. Furthermore, mirrors are not a cost-effective solution and must be positioned with precision, and this is costly labour-wise.

SUMMARY OF THE INVENTION

An object of the present invention is to provide a new method and a new system for displaying panoramic and horizontally immersive images.

Therefore, in accordance with the present invention, there is provided an image display system for surrounding a horizontal field of view of a viewer with images, comprising a portion of a sphere having a concavity defining an inner surface, a projection device adapted to project images from a center of a radius of curvature of the portion of a sphere so as to project images on the inner surface of the portion of a sphere, the image display system being adapted to at least partially receive at least one viewer in the concavity such that at least a horizontal field of view of the at least one viewer is surrounded by at least one image projected from said center on the inner surface of the portion of a sphere.

Also in accordance with the present invention, there is provided A method for surrounding a field of view with images, comprising the steps of: providing a portion of a sphere having a concavity defining an inner surface; positioning at least one viewer at least partially in the concavity such that a field of view of the at least one viewer is surrounded by an inner surface of the concavity; and projecting at least one image on the inner surface of the concavity from a center of a radius of curvature of the portion of a sphere.

BRIEF DESCRIPTION OF THE DRAWINGS

Having thus generally described the nature of the invention, reference will now be made to the accompanying drawings, showing by way of illustration a preferred embodiment thereof and in which.

DETAILED DESCRIPTION OF THE PREFERRED EMBODIMENTS

Figure 1:
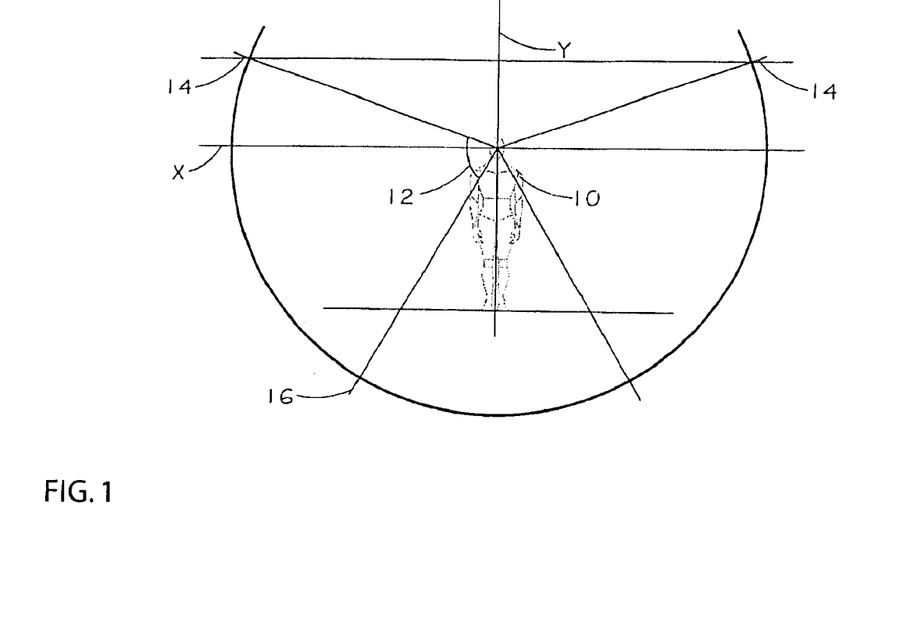
FIG. 1 is a schematic view of a person and of a field of view thereof.

Referring to the drawings, and more particularly to FIG. 1, a person 10 and his field of view 12 are generally illustrated. The person 10 defines an imaginary vertical axis Y, which is generally perpendicular to the line of sight X of the person 10 when watching the horizon. The field of view 12 of the person 10 is bounded by a sky limit line 14 (about 15° above the X-axis) and a ground limit line 16 (about 80° below the X-axis).

An image display system in accordance with the present invention will surround the person 10 with 360° of panoramic images or image streams (motion picture) such that the field of view 12 of the person 10 is constantly filled with images. This will provide a sensation of immersion to the person 10. A change of point of view of the person 10, e.g., by the person 10 rotating on himself/herself, will enable the person 10 to view different images or different portions of a same panoramic image. Accordingly, by projecting a panoramic image of the horizon, the person 10 will be surrounded by a virtual environment, such that he/she will have the sensation that he/she is in the center of the environment surrounding him/her.

Figure 4:
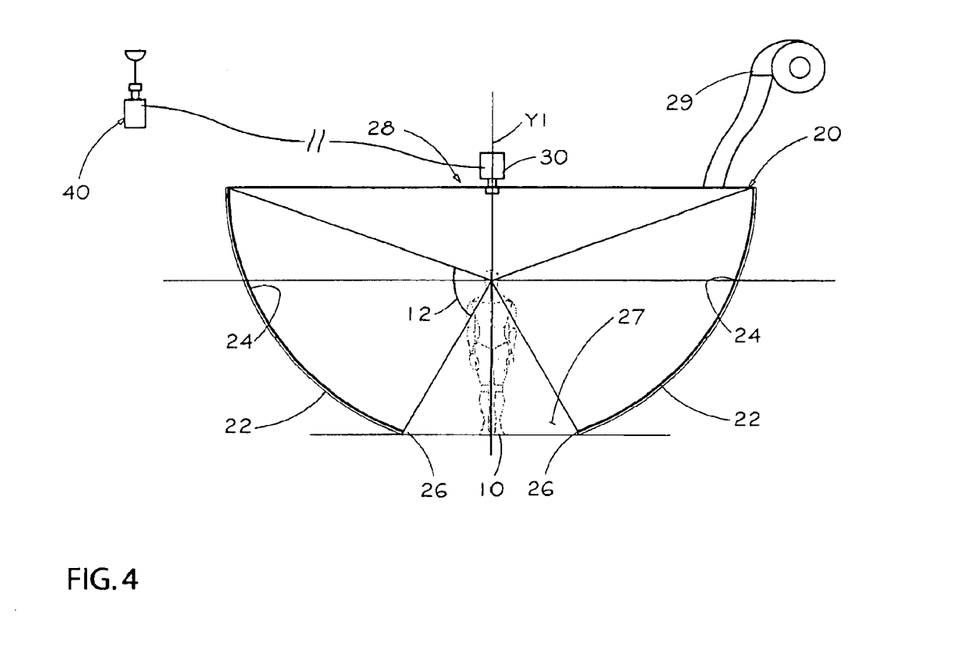
FIG. 4 is a schematic view of the image display system with a viewer therein.

Referring to FIG. 4, the image display system of the present invention is generally shown at 20, with the person 10 (i.e., the viewer) positioned in the middle thereof. More specifically, the viewer 10 has his vertical axis Y generally colinear with a vertical axis Y1 of the image display system 20, which passes through the center (i.e., center of the radius of curvature) of a hemispheric wall 22 of the image display system 20. The hemispheric wall 22 has an inner surface 24 that is the screen upon which images will be projected. The hemispheric wall 22 is truncated at a bottom thereof at opening 26 to allow access to an inside of the image display system 20 and to define a viewing area 27. The image display system 20 may be either open or closed at an upper end 28 thereof. By closing the upper end 28 of the image display system 20, the concavity defined by the inside of the hemispheric wall 22 will be isolated from ambient light and will allow a buildup of air pressure in the inside of the image display system 20 so that it keeps its same hemispherical shape. This is illustrated in FIG. 4, with an air source 29 providing the inside of the image display system 20 with an air supply. The hemispheric wall 22 may be, for instance, a translucent fabric, although other fabrics or solid materials may be used as long as they can reflect light. A projection device 30 is generally positioned at the center of the hemispheric wall 22 to project images on the inner surface 24. The field of view 12 of the viewer 10 generally coincides with the inner surface 24 of the hemispheric wall 22 such that, when the viewer 10 looks at the horizon, all he/she sees are essentially images displayed on the inner surface 24.

The position of the projecting device 30 at the center of the hemispheric wall 22 ensures that the projection device 30 is generally equally spaced from all points of the inner surface 24 of the hemispheric wall 22, i.e., by the aforementioned radius of curvature. Accordingly, certain types of projected images (i.e., the output of the projection device 30) will not need to be digitally modified between recording of images and projection of images on the inner surface 24 of the hemispheric wall 22, for the displayed image (i.e., the image displayed on the inner surface 24 as seen by the viewer 10) to be generally free of distortion. Accordingly, as will be explained hereinafter, off-the-shelf equipment can be used to record images that will produce a generally distortion-free display when projected on spherical screens. This will save the step of intervention to digitally modify the images to adapt them to a spherically shaped screen. Real-time projections are thus possible without the requirement of additional computational power and appropriate software to modify the format of the images to fit spherical screens.

Figure 2:
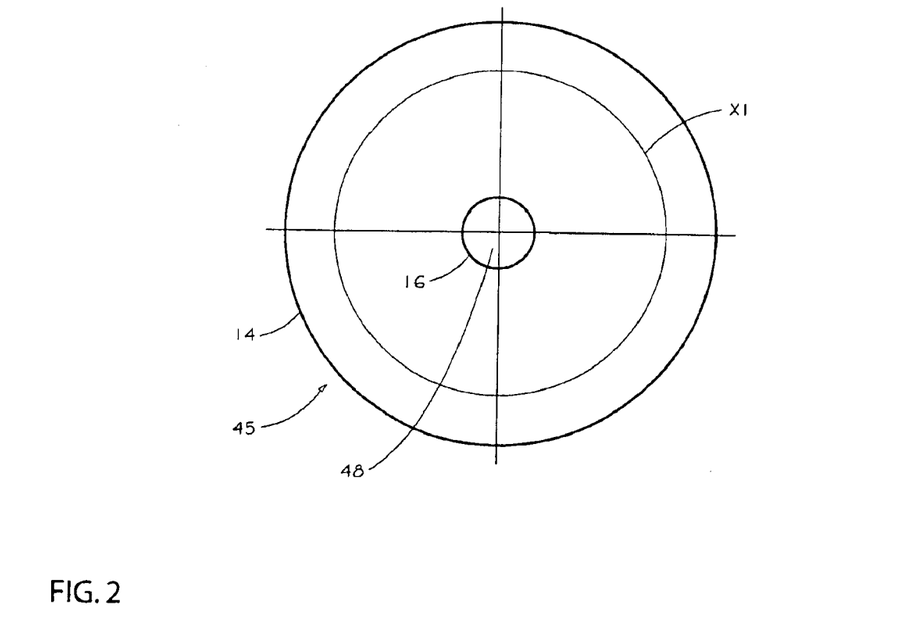
FIG. 2 is a schematic representation of a recorded 360° panoramic image to be used with an image display system of the present invention.
Figure 3:
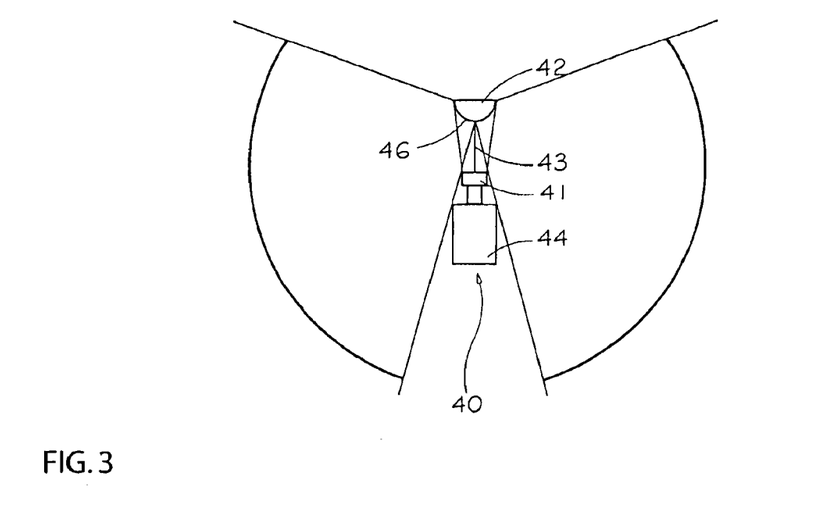
FIG. 3 is a schematic view of a 360° panoramic image recorder to be used with the image display system.

Referring to FIG. 3, an image recorder 40 is illustrated and enables production of images or image streams. The image recorder 40 consists of a lens 41, a reflector 42, an arm 43 and a camera 44. The reflector 42 has a generally hemispheric (or conico-spherical) shape with the spherical portion facing toward the camera 44. A surface 46 of the spherical portion is reflective such that the camera 44 will record images that are reflected by the reflector 42. More specifically, the images recorded will be panoramic (anamorphic encoding of the panoramic field of view), at 360°, as the center of the reflector 42 is in line with the center of the lens 41 of the camera 44 and, thus, only a single camera will be required to supply the projection device 30 with 360° panoramic images in the form of photographic images or image streams. A typical recorded image of the image recorder 40 is illustrated as an anamorphic annular image 45 in FIG. 2, with the horizon shown as circle X1, the sky limit line at 14 and the ground limit line at 16. It is pointed out that the arm 43, which secures the reflector 42 to the camera, creates a blind spot 48 on the recorded image 45. However, the blind spot 48 will not appear on the inner surface 24 of the image display system 20 when the image is displayed thereon, as the blind spot 48 will coincide with the viewing space 27. The anamorphic image recorded represents an area corresponding to 360° horizontally by approximately 95° vertically.

Referring to FIG. 3, the reflector 42 is attached to the lens 41 via the arm 43. Such a kit, comprising a reflector attached to a lens by an arm, is known in the art. For instance, the company Remote Reality has such kits under the designation OneShot360™, which adapts to standard professional cameras. For instance, the camera 44 can be of the model commercialized by the company Sony under the designation HDW750 (high definition video camera). Of course, it is within the scope of the present invention to use other types or brands of anamorphic lens kits and cameras.

The projection device 30 can project the recorded image or image stream on the inner surface 24 of the image display system 20 so as to produce a distortion-free display on the inner surface 24 of the hemispheric wall 22. Accordingly, the anamorphic annular image recorded by the image recorder 40 can be projected without the images being reworked or modified, to produce a displayed image generally distortion-free and of even brightness on the inner surface 24 of the image display system 20. However, the projection device 30 must be generally positioned at the center of the hemispheric wall 22.

Figure 10:
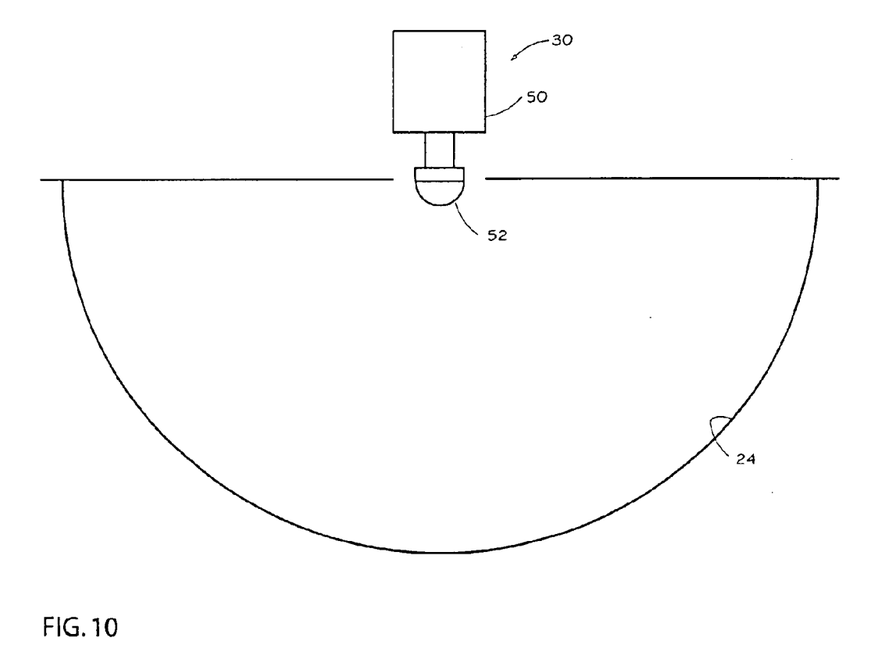
FIG. 10 is a schematic view of a first configuration of a projection device of the image display system.

Referring to FIG. 10, the projection device 30 is shown having a projector 50 and a lens 52, to produce a displayed image 54. The lens 52 is a wide-angle hemispheric projection lens, for example, as commercialized as TruTheta® by Elumens Corporation, and is adapted to cover the full inner surface 24 with its projection. The projector 50 is preferably a standard high-resolution data projector. For instance, the SXGA projector manufactured and commercialized by JVC as DLA-G15U is well suited for the image display system 20. It is obvious that other brands and/or models of projectors and hemispheric lenses can be used within the scope of the present invention. The quality of the displayed image is directly proportional to the level of resolution at the recording and projection.

It is pointed out that computer generated images of a 3-D model may be projected onto the inner surface 24 so as to be visualized by the person 10 in the image display system 20. For instance, a 3-D scenery or object created using 3-D Studio may be translated into panoramic images to be projected by the projection device 30. In the creation of these panoramic views from a 3-D model, the anamorphic annular pattern of the typical recorded image 45 of FIG. 2 is used, with the horizon X1 being positioned between three quarters (¾) and four fifths (⅘) of the radius from the center. The center of the image will be defined by the point where the vertical line intersecting the observation point, namely Y1, touches the ground. Also, as shown in FIG. 4, the projection device 30 and the image recorder 40 can be wired to one another, such that real-time images can be displayed by the projector 30 on the inner surface 24 of the hemispheric wall 22.

Various configurations of the image display system 20 are proposed. It is pointed out that the dimensions of the hemispheric wall 22 can be modified depending on the intended application of the image display system 20. The image display system 20 can be designed to accommodate one spectator or a plurality of spectators. For instance, the image display system 20 can be transformed into a panoramic theater capable of accommodating a great number of spectators. In such a case, the viewing space 27 can be shared by many spectators, with the spectators being free to move without interference from cumbersome equipment. In this position, the spectators will not cause interference with the projected image from the projection device 30, as their position coincides with the blind spot 48, as illustrated in FIG. 2.

Figure 5:
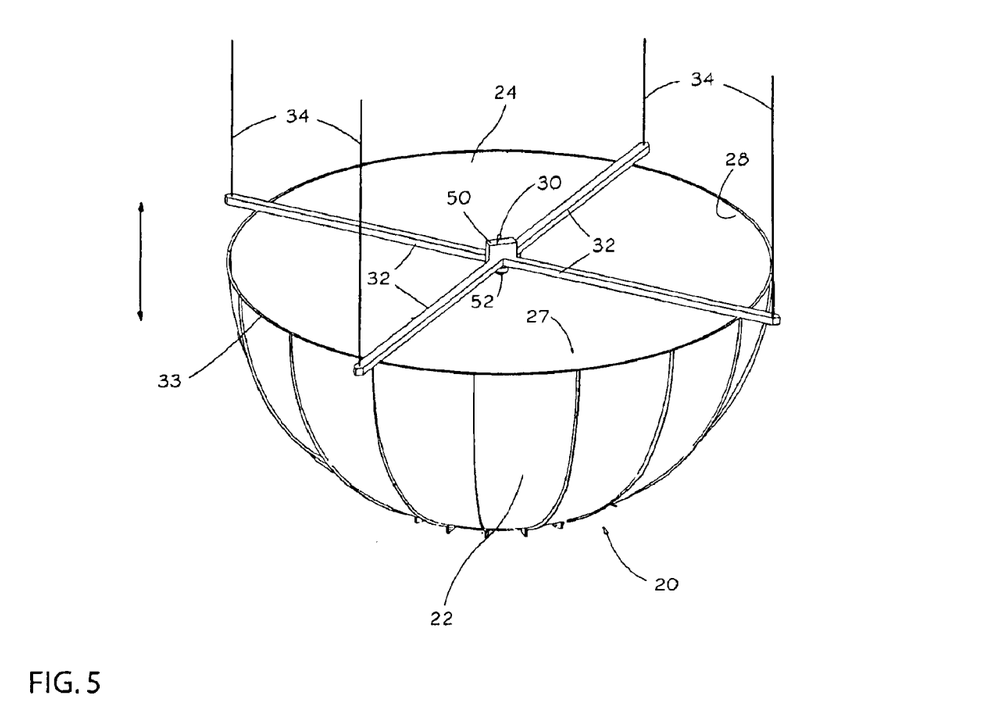
FIG. 5 is a perspective view of the image display system as configured to be suspended.
Figure 6:
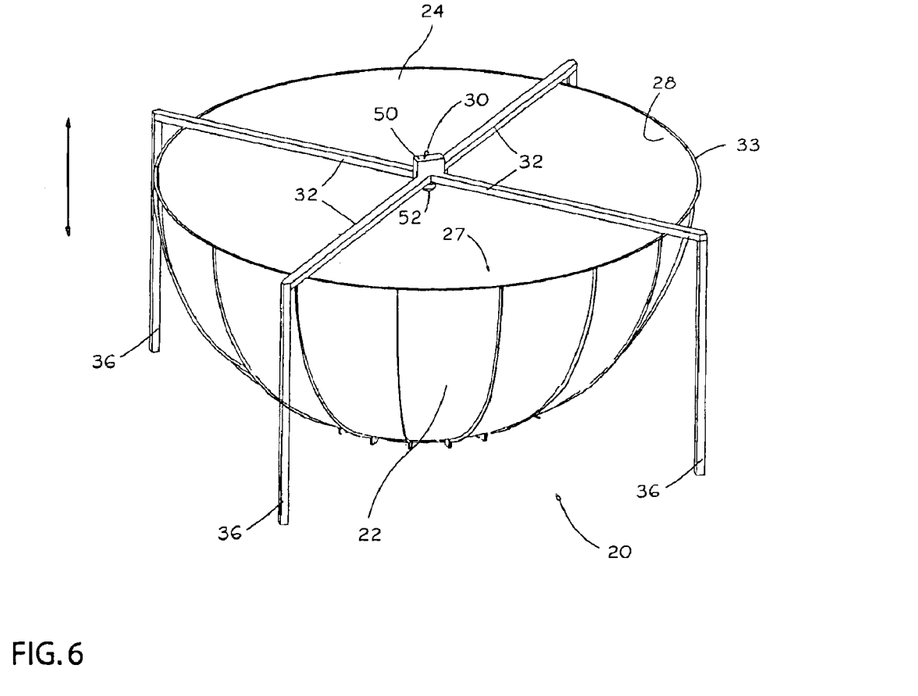
FIG. 6 is a perspective view of the image display system as configured to be self-supported.

Referring to FIGS. 5 and 6, the image display system 20 can be suspended or self-supporting. In FIG. 5, the projection device 30 is held in position at the center of the hemispheric wall 22 by arms 32. The opening 28 at an upper end of the image display system 20 is defined by a rim 33, which supports the hemispheric wall 22. Cables 34 are provided at the junction of ends of the arms 32 and the rim 33, so as to suspend the hemispheric wall 22 from a ceiling or other supporting structure (not shown). In FIG. 6, the image display system 20 is shown having legs 36 projecting from the junction of the arms 32 and the rim 33, that will enable the image display system 20 to be self-supported.

Figure 7:
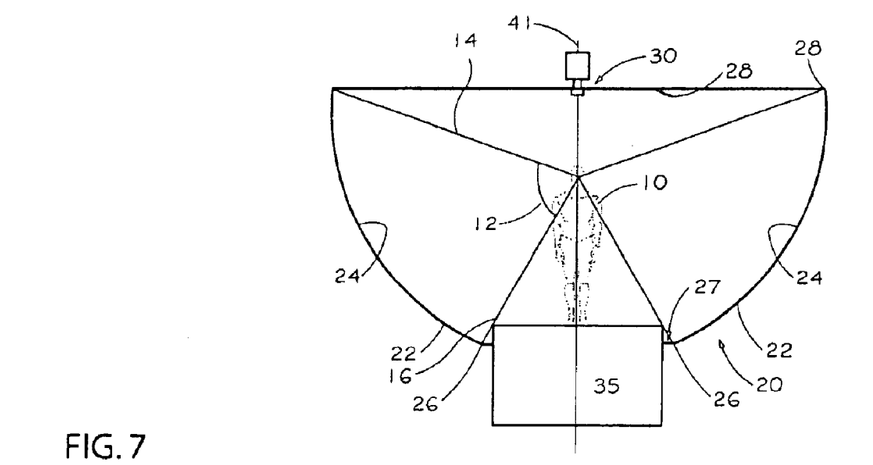
FIG. 7 is a schematic view of the image display system having a support structure for viewers.
Figure 8:
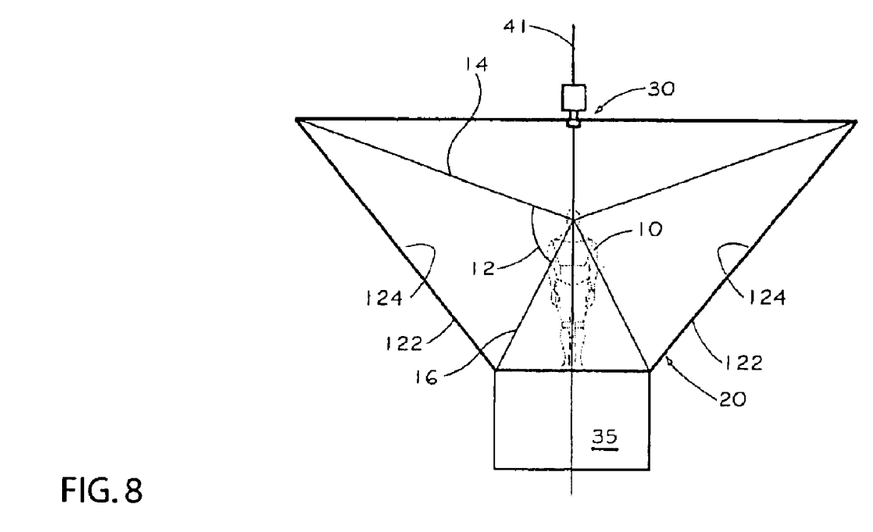
FIG. 8 is a schematic view of the image display system in accordance with a second embodiment of the present invention.

The opening 26 at a bottom of the hemispheric wall 22 can be used to enter the image display system 20. In FIGS. 7 and 8, a support structure 35 for viewers is provided to elevate the viewer 10 to an appropriate level in the image display system 20. On the other hand, the image display system 20 may be adjustable vertically by modifying the length of the cables 34 in the configuration of FIG. 5 or by providing the junction between the legs 36 and the rim 33 with translation mechanisms. For instance, the cables 34 may be operatingly supported by pulleys on a ceiling and counterweights 39 such that the image display system 20 may easily be displaced. It is pointed out that the hemispheric wall 22 of FIG. 7 has been replaced by a frustum of a cone 122 in FIG. 8.

Figure 9:
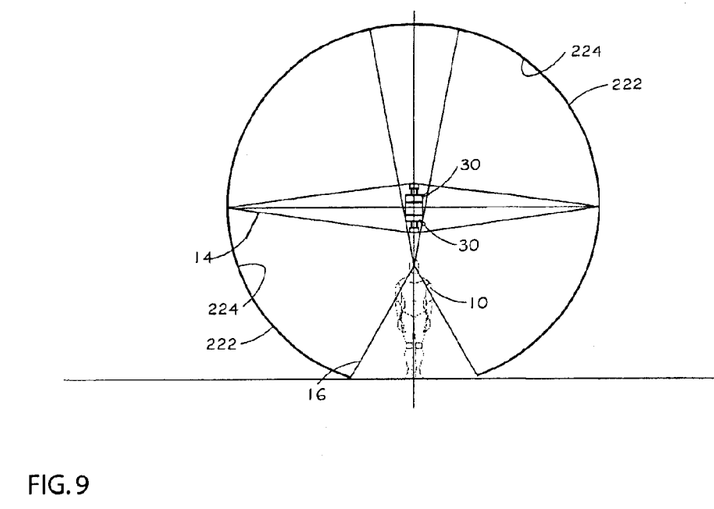
FIG. 9 is a schematic view of the image display system in accordance with a third embodiment of the present invention.

As shown in FIG. 9, a pair of projection devices 30 may be put back-to-back so as to create a spherical displayed image on an inner surface 224 of a spherical wall 222. To do so, the images projected by the projection devices 30 must be merged in order to provide a good transition between the display of a first projection device 30 and a second projection device 30.

Figure 11:
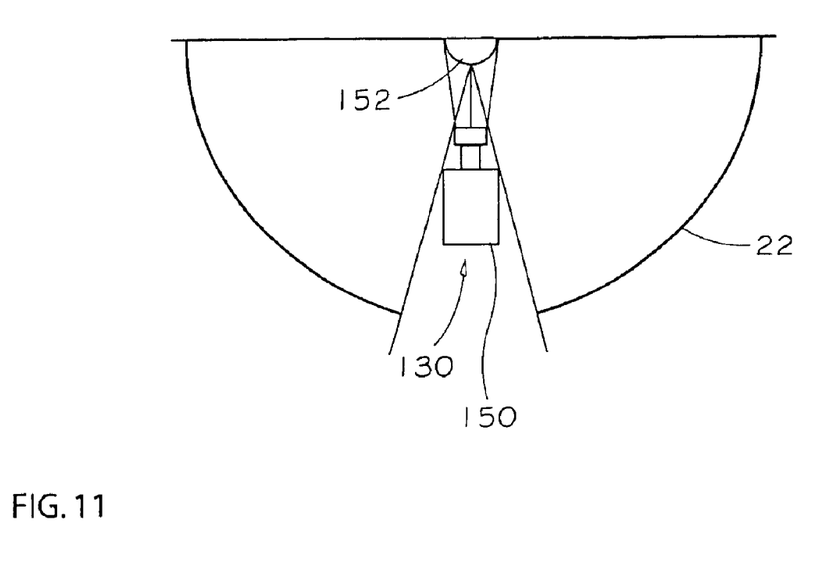
FIG. 11 is a schematic view of a second configuration of the projection device of the image display system.

Referring to FIG. 11, an alternative to the projection device 30 is illustrated at 130. The projection device 130 has a projector 150 and a reflector 152, similar to the reflector 42 used in the image recording. The image projected by the projector 150 is reflected and thus indirectly projected, as shown in FIG. 11, on the hemispheric screen 22. The projection device 30 is positioned in the viewing space 27, such that the image displayed is not reduced in size due to the fact that the projection device 130 is not above the hemispheric screen 22.

Accordingly, the image display system 20 represents a simple and relatively inexpensive apparatus for viewing fully immersive horizontal and panoramic images or image streams. The image recorder 40 and the projection device 30 are off-the-shelf items, and can be adapted to the hemispheric wall 22 for forming the image display system 20.

Since the image display system 20 represents space in panoramic and horizontally immersive mode, it could in the future redefine the standards of television and cinema to give birth to new forms of presentation, teaching and entertainment.

As the formation of the panoramic image requires the production of a single image source, the production of panoramic programs for the panoramic image display system is greatly simplified. This could result in a fast emergence of the panoramic programs and a multiplication of the panoramic program presentation sites.

Applications of the panoramic and horizontally immersive image display system of the present invention comprise presentation of information in the area of business, education and entertainment, cinema (motion pictures), games, shows and exhibitions, security and surveillance, simulators, etc.

What is claimed is:

1. An image display system for surrounding a horizontal field of view of a viewer with images, comprising a portion of a sphere having a concavity defining an inner surface, a projection device adapted to project images from a center of a radius of curvature of the portion of a sphere so as to project images on the inner surface of the portion of a sphere, the image display system being adapted to at least partially receive at least one viewer in the concavity such that at least a horizontal field of view of the at least one viewer is surrounded by at least one image projected from said center on the inner surface of the portion of a sphere, wherein the at least one image projected on the inner surface of the portion of a sphere is an anamorphic annular panoramic image representing an area corresponding to at least 80° under the horizon and 15° over the horizon and 360° horizontally.

2. The image display system according to claim 1, wherein the images are one of filmed from an environment and of generated from a computer model.

3. The image display system according to claim 1, wherein the portion of a sphere consists of at least one of a translucent material and a material capable of reflecting images projected by the projector.

4. The image display system according to claim 3, wherein the portion of a sphere is closed so as to hold a positive pressure differential in the concavity with respect to an exterior of the portion of a sphere, so as to preserve a shape of the portion of a sphere.

5. The image display system according to claim 1, wherein the portion of a sphere is a sphere, two projection devices being also provided adapted to project images from said center, wherein an image displayed on the inner surface of the sphere is a merge of projections of the two projection devices.

6. The image display system according to claim 1, wherein the projection device is a projector with a wide-angle hemispheric lens positioned at said center.

7. The image display system according to claim 1, wherein the projection device is a projector and a reflective hemisphere reflecting a projection of a projector onto the inner surface of the portion of a sphere.

8. The image display system according to claim 1, wherein the portion of a sphere is one of suspended and self supported.

9. The image display system according to claim 8, wherein the portion of a sphere is displaceable vertically so as to adjust to a height of a viewer.

10. The image display system according to claim 9, further comprising a viewer support surface received partially in the bottom opening of the portion of a sphere.

11. The image display system according to claim 1, further comprising a viewer entrance to the concavity at a bottom opening in the portion of a sphere.

12. The image display system according to claim 1, further comprising any one of an image recorder and an image generator connected to the projection device such that real-time images can be projected on the portion of a sphere.

13. A method for surrounding a field of view with images, comprising the steps of:

providing a portion of a sphere having a concavity defining an inner surface;

positioning at least one viewer at least partially in the concavity such that a field of view of the at least one viewer is surrounded by an inner surface of the concavity; and projectihg an anamorphic annular panoramic image on the inner surface of the concavity from a center of a radius of curvature of the portion of a sphere, the anamorphic annular panoramic image representing an area corresponding to at least 80° under the horizon and 15° over the horizon and 360° horizontally.

14. The method according to claim 13, wherein the anamorphic annular panoramic image is generated from a computer model.

15. The method according to claim 13, further comprising a step of recording anamorphic annular panoramic images, such that the anamorphic annular panoramic images are projected in the step of projecting the image on the inner surface of the concavity from a center of a radius of curvature of the portion of a sphere, so as to produce a generally distortion-free image without the anamorphic annular panoramic images being modified after the step of recording.

16. The method according to claim 15, wherein the steps of recording anamorphic annular panoramic images and projecting the anamorphic annular panoramic images on the inner surface of the concavity from a center of a radius of curvature of the portion of a sphere are performed sequentially in real-time.

17. An image display system for surrounding a horizontal field of a viewer with images, comprising a portion of a sphere having a concavity defining an inner surface, a projector with a wide-angle hemispheric lens adapted to project images from a center of a radius of curvature of the portion of a sphere so as to project images on the inner surface of the portion of a sphere, the image display system being adapted to at least partially receive at least one viewer in the concavity such that at least a horizontal field of view of the at least one viewer is surrounded by at least one image projected from said center on the inner surface of the portion of a sphere.

* * * * *